United States Patent
Inon

(10) Patent No.: US 7,522,712 B2
(45) Date of Patent: Apr. 21, 2009

(54) METHOD FOR INITIATING A SESSION IN A STORE AND FORWARD MESSAGING SYSTEM

(75) Inventor: Gad Inon, Rosh Ha'ayin (IL)

(73) Assignee: Comverse Ltd., Tel Aviv (IL)

( * ) Notice: Subject to any disclaimer, the term of this patent is extended or adjusted under 35 U.S.C. 154(b) by 684 days.

(21) Appl. No.: 10/765,870

(22) Filed: Jan. 29, 2004

(65) Prior Publication Data

US 2005/0169444 A1  Aug. 4, 2005

(51) Int. Cl.
*H04M 1/64* (2006.01)
(52) U.S. Cl. ............... 379/88.26; 379/88.18; 455/412.1
(58) Field of Classification Search ............. 379/88.22, 379/88.13, 88.17, 88.18, 88.26; 348/14.06; 707/104.1; 709/224, 205, 228; 455/412.1, 455/451
See application file for complete search history.

(56) References Cited

U.S. PATENT DOCUMENTS

| | | | |
|---|---|---|---|
| 5,412,375 A * | 5/1995 | Wood | 455/451 |
| 5,689,553 A | 11/1997 | Ahuja et al. | |
| 5,896,165 A * | 4/1999 | Rao | 348/14.06 |
| 6,061,432 A | 5/2000 | Wallace et al. | |
| 6,233,318 B1 * | 5/2001 | Picard et al. | 379/88.17 |
| 6,771,749 B1 * | 8/2004 | Bansal et al. | 379/88.17 |
| 6,865,384 B2 * | 3/2005 | Sagi et al. | 455/412.1 |
| 6,868,143 B1 * | 3/2005 | Menon et al. | 379/88.13 |
| 2003/0065768 A1 * | 4/2003 | Malik | 709/224 |
| 2003/0126211 A1 * | 7/2003 | Anttila et al. | 709/205 |
| 2003/0236892 A1 * | 12/2003 | Coulombe | 709/228 |
| 2004/0225679 A1 * | 11/2004 | Oran | 707/104.1 |

* cited by examiner

*Primary Examiner*—Gerald Gauthier
(74) *Attorney, Agent, or Firm*—Sughrue Mion, PLLC

(57) ABSTRACT

A method for initiating a session in a store and forward messaging system, such as a voice/video call answering (VCA) system, is provided. A data storage device stores capability information for subscribers of the messaging system, the capability information including data such as video codecs and audio codecs supported by the subscriber's device. When a session initiation request is received from a guest of the messaging system, the capability information of the device used by the guest is compared to the stored capability information of the device used by the subscriber for whom the guest wishes to deposit a message. If the capability information matches, the system presents to the guest only the matching capability information. The session continues using the matching capability information, thereby eliminating the need to transcode data when the message is retrieved by the subscriber.

16 Claims, 4 Drawing Sheets

Subscriber Session

METHOD FOR INITIATING A SESSION IN A STORE AND FORWARD MESSAGING SYSTEM

BACKGROUND OF THE INVENTION

1. Field of the Invention

The present invention relates a store and forward messaging system. More particularly, the present invention relates to a method for initiating a session in a store and forward messaging system that saves transcoding resources for the system.

2. Related Art

A conventional video telephony session (e.g., video conferencing) includes a session initiation between two telephony devices. As part of the session initiation, the two telephony devices exchange their capabilities (e.g., via H.245 or SIP) and then utilize one or more algorithms to agree on the codecs and/or video size or colors to be used for that session.

For example, one telephony device may declare that it supports Adaptive Multi-Rate (AMR) audio codec and video codecs H.263 and MPEG4 while the other telephony device may declare that it supports audio codec AMR but for video codec only supports H.263. In such a situation, the audio codec during the session will be selected as AMR and the video codec will be selected as H.263.

In a store and forward system, such as a Voice/Video Call Answering (VCA) system, the scenario is somewhat different because the session is considered to be "indirect." The session is considered to be indirect because the two telephony devices are never directly connected to one another. In this type of indirect system, the user calling the store and forward system to deposit a message is defined as a "guest" and the user of the store and forward system for whom the message is being deposited is defined as a "subscriber."

Thus, in a VCA system, rather than the guest creating a session directly with the subscriber, the guest creates a session with the VCA system. After the session is created, the VCA system saves the message left by the guest. Then, at a later point in time, the subscriber can dial into the VCA system and retrieve the message.

For example, using the same scenario described above in which the guest telephony device supports video codecs H.263 and MPEG4, and the VCA system also supports video codecs H.263 and MPEG4, the session may utilize MPEG4 for the choice of video codec and thus the VCA system will store the message using MPEG4. However, if the subscriber dials into the VCA system using an H.263 only telephony device, the VCA system must transcode (i.e., convert) the message stored in MPEG4 format to the H.263 format which is required by the subscriber's telephony device (prior to playing the message to the subscriber).

Depending on the network behavior, and the capabilities of the subscriber's telephony device, the amount of transcoding required may be quite significant, thus requiring a great deal of hardware. In addition, the required transcoding may cause a significant degradation of the audio and/or video data being retrieved by the subscriber. Therefore, what is needed is a system and method in a store and forward system for reducing the amount of transcoding required when forwarding stored messages to a subscriber.

SUMMARY OF THE INVENTION

According to an illustrative embodiment of the present invention, a method for initiating a session in a store and forward messaging system is provided. A data storage device stores capability information for subscribers of the store and forward messaging system, wherein the capability information includes data such as video codecs and audio codecs supported by the subscriber's devices. When a session initiation request is received from a guest of the store and forward messaging system, the capability information of the guest's device is compared to the capability information of the subscriber's device for whom the guest wishes to deposit a message.

If the capability information does not match, the messaging system presents to the guest default capability information that is supported by the messaging system. When the subscriber retrieves the message, however, transcoding will be required in order to convert the message to a format supported by the subscriber's device. On the other hand, if the capability information matches, the messaging system presents to the guest only the matching capability information. Therefore, the session continues using the matching capability information, thereby eliminating the need to transcode data when the message is retrieved by the subscriber.

The above and other features of the invention including various and novel details of construction and combination of parts will now be more fully described with reference to the accompanying drawings and pointed out in the claims. It will be understood that the particular features embodying the invention are shown by way of illustration only and not as a limitation of the invention. The principles and features of this invention may be employed in varied and numerous embodiments without departing from the scope of the invention.

BRIEF DESCRIPTION OF THE DRAWINGS

Aspects of illustrative, non-limiting embodiments of the present invention will become more apparent by describing in detail embodiments thereof with reference to the attached drawings in which.

DETAILED DESCRIPTION OF THE INVENTION

The following description of illustrative non-limiting embodiments of the invention discloses specific configurations, features, and operations. However, the embodiments are merely examples of the present invention, and thus, the specific features described below are merely used to more easily describe such embodiments and to provide an overall understanding of the present invention.

Accordingly, one skilled in the art will readily recognize that the present invention is not limited to the specific embodiments described below. Furthermore, the description of various configurations, features, and operations of the present invention that are known to one skilled in the art are omitted for the sake of clarity and brevity. Also, it is to be understood that the phraseology and terminology employed herein is for the purpose of description and should not be regarded as limiting.

Figure 1:
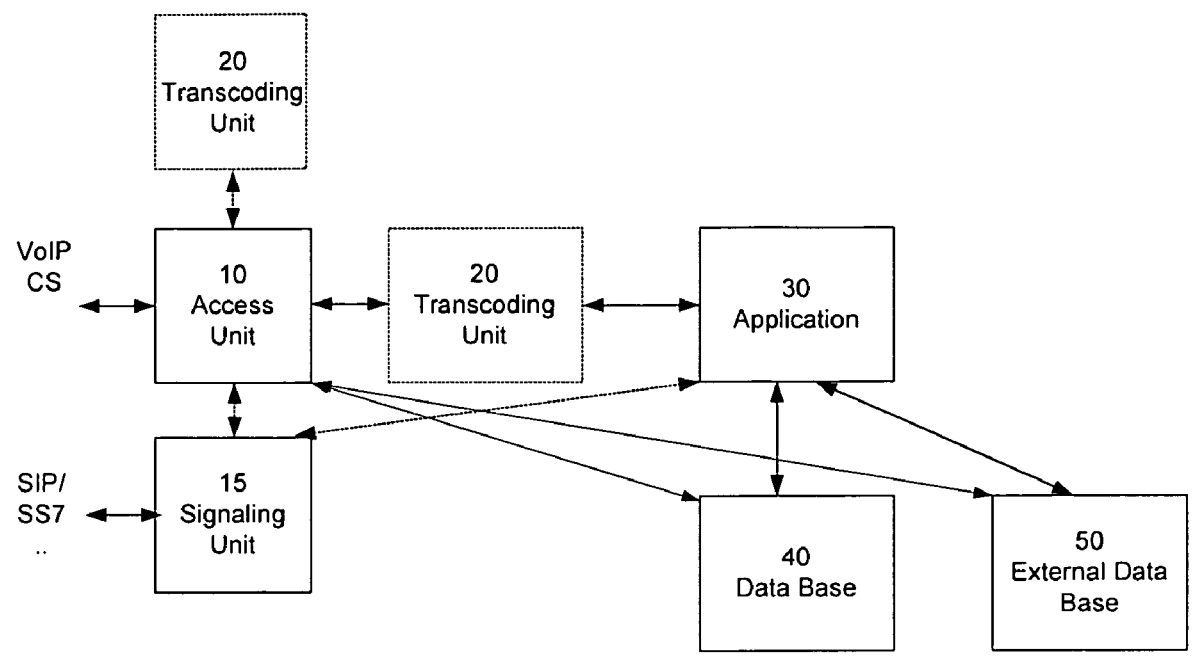
FIG. 1 shows an architecture of a store and forward messaging system according to an illustrative embodiment of the present invention.

FIG. 1 depicts a system architecture for a store and forward messaging system according to an illustrative embodiment of the present invention. As shown in FIG. 1, a connection to the external world (e.g., via Voice-over-IP (VoIP) or a circuit switch (CS)) occurs through access unit 10 and signaling unit 15. Depending on a network type, access unit 10 will use Real Time Protocol (RTP) streams in VoIP and will use T1/E1/J1 in CS. Signaling unit 15 will use ISDN or SS7 in CS and H.323 or SEP in VoIP. In addition, in certain cases, ISDN can be retrieved by access unit 10, as is known to those skilled in the art.

A transcoding unit 20 is provided which is able to transcode codecs and presentation properties (e.g. size and colors) if required. For example, if a receiving device requires data to be in H.263 as the codec while an external video system sends data in MPEG4, transcoding unit 20 will transcode (i.e., convert) the incoming data from MPEG to H.263. The transcoding unit 20 can also be used when a subscriber retrieves data (e.g., when the format that is stored doesn't match the format required by the subscriber's device).

As shown in FIG. 1, transcoding unit 20 can be disposed between access unit 10 and an application 30. Alternatively, access unit 10 can be disposed between transcoding unit 20 and application 30. Access unit 10, signaling unit 15 and transcoding unit 20 are all logical devices and, therefore, may be hosted in a variety of different configurations. For example, access unit 10, signaling unit 15 and transcoding unit 20 may each reside in separate hardware units. Alternatively, access unit 10, signaling unit 15 and transcoding unit 20 may all reside in a single hardware unit or any variation of the above.

Application 30 stores the messages on a storage device and is responsible for receiving a session initiation request from access unit 10 or signaling unit 15. The session initiation request may include session parameters such as CLI/DN from signaling unit 15 and the capabilities of a guest device received from signaling unit 15 or access unit 10, depending on the signaling type being used. Application 30 can be tailored based on the type of operating system that is being utilized and is responsible for the majority of the logic of the present invention.

Application 30 uses a local database 40 to store received messages and to store a profile for subscribers of the store and forward messaging system. The subscriber profile contains data relating to the capabilities of the device that the subscriber uses to access the messaging system. The database 40 may be composed of a single unit for storing the messages and subscriber profile or may be composed of multiple units such as a database server or LDAP (Lightweight Directory Access Protocol) server for storing the profile and a database server, file server or E-mail server for storing the messages. Also, in certain instances, application 30 may utilize local database 40 for storing some of the information and an external database 50 for storing other parts of information.

Application 30 and local database 40 are logical devices and, therefore, as described above, may be hosted in a variety of ways. For example, they may reside in individual hardware units, may be combined into a single hardware unit or combined in any variation of the above. In some cases, for efficiency, the access unit 10 will directly access local database 40 or external database 50 to perform the actual retrieval of the stored message. For example, if the stored message includes a WAV attachment file, access unit 10 can access the attachment file and read the file itself (based on a file name passed from the application) from database 40.

Figure 2:
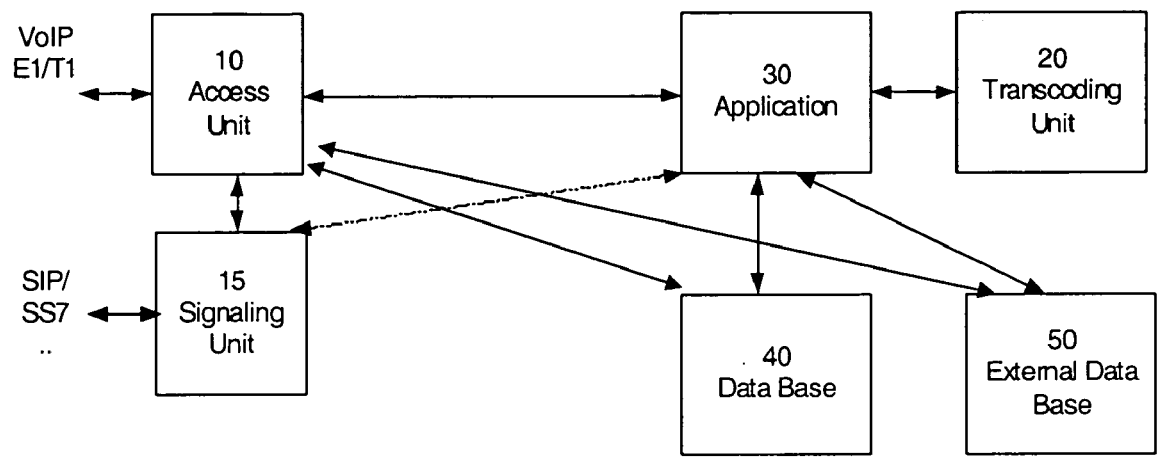
FIG. 2 shows an architecture of a store and forward messaging system according to another illustrative embodiment of the present invention.

FIG. 2 shows a slightly modified version of the system architecture of the present invention in which the only direct connection to transcoding unit 20 is via application 30. Transcoding unit 20 is used by application 30 to transcode in one of three ways:

(1) when a message is received from a guest, transcoding unit 20 converts the message before sending it to either local database 40 or external database 50;

(2) after storing the message in either local database 40 or external database 50, application 30 utilizes transcoding unit 20 to convert the message and returns the message to the appropriate database in the converted form; and (3) when a message is being retrieved by a subscriber, application 30 retrieves the message, utilizes transcoding unit 20 to convert the message and then either passes the converted message to access unit 10 itself or instructs unit 20 to send the converted message to access unit 10.

The three ways described above in which application 30 may use transcoding unit 20 are merely shown as illustrative examples only and, accordingly, any combination of the above methods could be employed.

Transcoding unit 20 is responsible for converting data between different format types. For example, transcoding unit 20 is able to convert between different audio codes and rates such as different AMR rates or AMR to EVRC. Transcoding unit 20 can convert between different video codecs such as H.263 and MPEG4 and between different rates of video codecs (e.g., 40 Kbits/s and 50 Kbits/sec). Transcoding unit 20 can also convert between different video size and different colors (e.g., QGIF and CIF or 4096 colors and 256 colors). Again, the above types of conversions are merely described as illustrative examples only and are not intended to be limiting in any manner. Transcoding unit 20, although not shown in FIG. 1 or FIG. 2, can be instructed to retrieve or store the messages directly from database unit 40 or external database unit 50.

In order to save transcoding resources for the system, the VCA system determines the capabilities of the subscriber's device. This can be accomplished in various ways. For example, when the subscriber initially subscribes to the system, the subscriber may provide the VCA system with a device type and device capabilities. This information can then be stored in database 40 or external database 50 such that the information can be retrieved when necessary.

As another example, when a subscriber logs into the VCA system, application 30 can monitor the capabilities of subscriber's device and can save this monitored information in database 40 or external database 50. Such an example is described with reference to FIG. 3.

Figure 3:
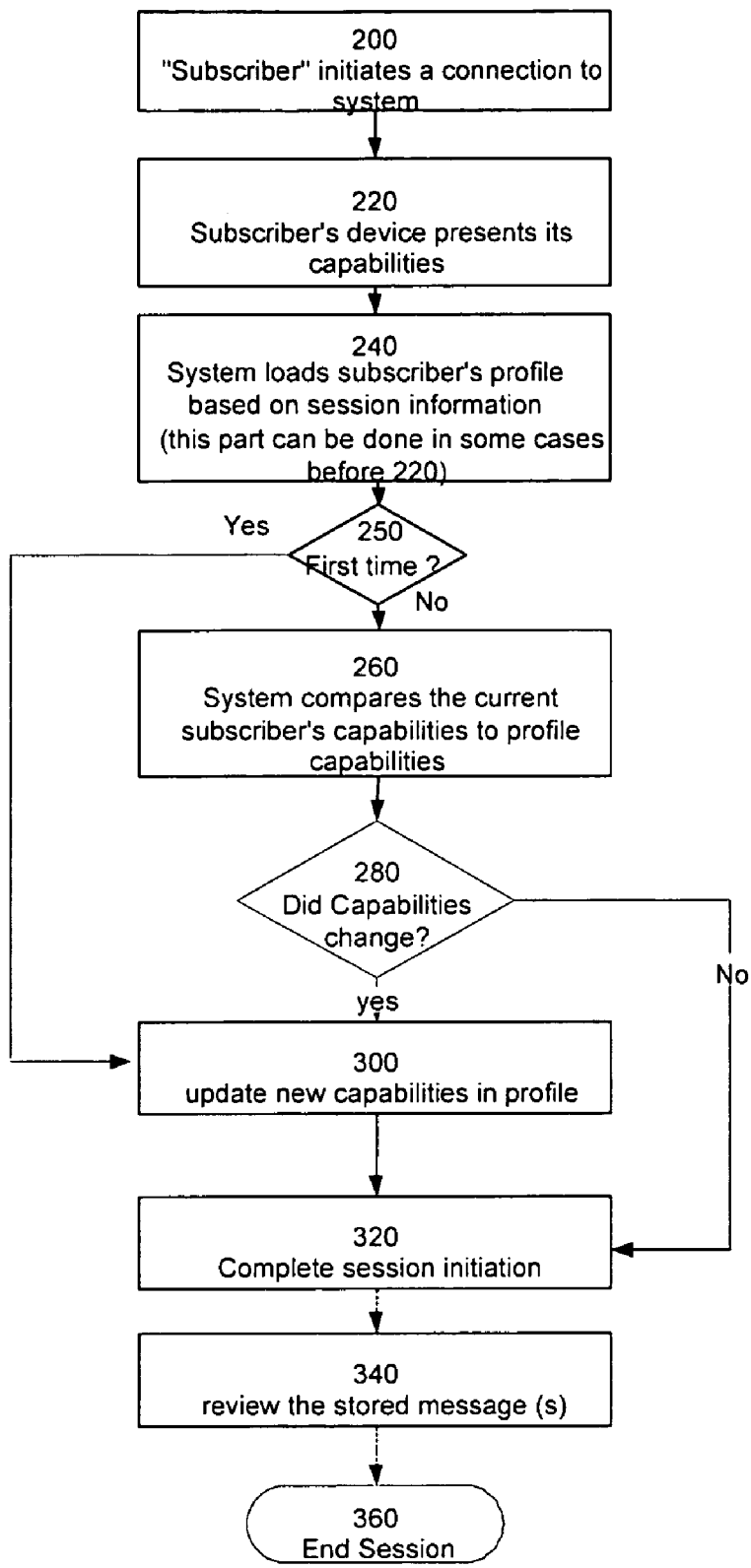
FIG. 3 shows a method for a subscriber to initiate a session in a store and forward messaging system according to an illustrative embodiment of the present invention.

FIG. 3 shows the steps that occur when a subscriber initiates a connection to the VCA system. As shown in FIG. 3, a subscriber initiates a connection to the VCA system in step 200. In step 220, the subscriber's device presents its capabilities to the VCA system which in circuit switch video conferencing (H.324M) as well as VoIP is done using H.245 or as part of SIP protocol. The VCA system, in step 240, loads the subscriber's profile based on session information that was received at session initiation. In other illustrative embodiments, the step of loading the subscriber's profile may occur prior to step 220 or in parallel with step 220.

In step 250, based on the subscriber's profile the system checks if this is the first time the subscriber is calling the system or if the subscriber's profile was initialized for some reason. If this is the case, then the session will proceed directly to step 300.

In step 260, the subscriber's current capabilities are compared to the stored profile capabilities and to the class of service requested. In step 280, it is determined whether the capabilities of the subscriber have changed since the last session. If the capabilities have changed, database 40 or external database 50 will be updated in step 300 and the session initiation will proceed to completion in step 320. If it is determined in step 280 that the capabilities have not changed, the session skips step 300 and proceeds directly to the completion of session initiation in step 320.

At step 340, the session continues and the subscriber is able to review stored messages. If a message was stored using the subscriber's capabilities as defined by the system then no transcoding will have to be performed. On the other hand, if there was not a match between the capabilities of the guest and the capabilities of the subscriber, then the system will need to transcode the data. When the subscriber is finished retrieving stored messages, the session will end as shown by step 360.

The capabilities that are presented to a guest will normally be the last capabilities presented to the VCA system by the subscriber. However, it is possible for the system to be configured such that if the subscriber changes capabilities, the new capabilities are only presented to a guest after the same new capabilities are presented to the VCA system for a certain number of consecutive times. The subscriber can configure the VCA system so as to select the number of consecutive times required before the old capabilities are replaced.

If the subscriber's device supports multiple capabilities (e.g., MPEG4 and H.263 video codec), application 30 of the VCA system is able to choose one of the formats that it determines is the most appropriate. Further, a subscriber may maintain multiple accounts on a single store and forward system, wherein each of the subscriber's accounts maintains a different set of capabilities.

Figure 4:
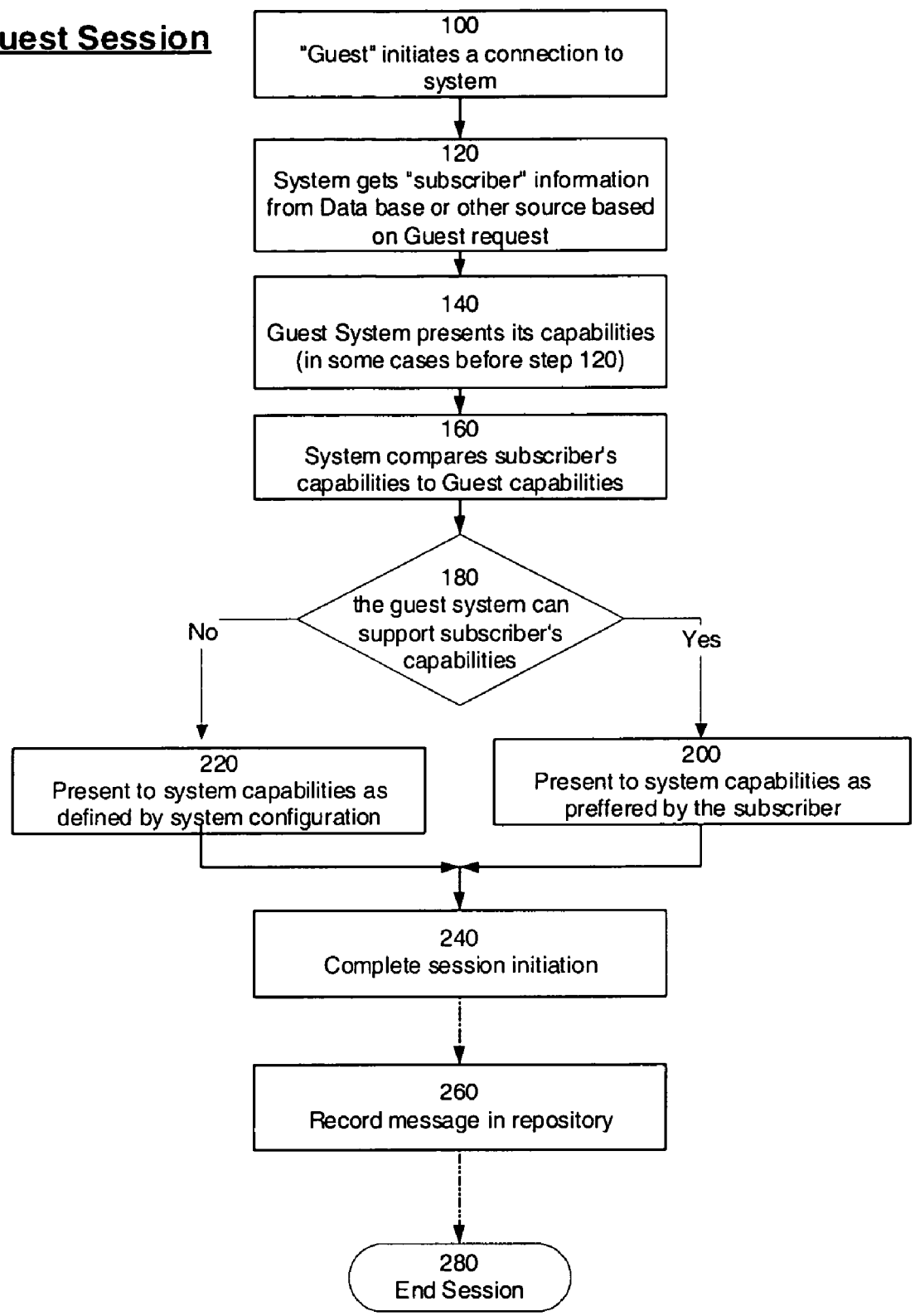
FIG. 4 shows a method for a guest to initiate a session in a store and forward messaging system according to an illustrative embodiment of the present invention.

FIG. 4 depicts a method for a guest calling the VCA system to leave a message for a subscriber. In step 100, the guest initiates a connection to the system using a signaling protocol such as SS7 or ISDN or H.323/SIP in VoIP. After the connection is established, application 30 of the VCA system retrieves the subscriber profile from a local or external data storage device. In step 140, the guest device, using a particular protocol (e.g., H.245 in 3GPP/3GPP2 video conferencing or H.323 in VoIP) presents its capabilities. In another illustrative embodiment, step 140 occurs in parallel with the step of retrieving subscriber information.

In step 160, the capabilities presented by the guest device are compared to the capabilities of the subscriber's device and to the VCA system preferences. As shown in step 200, if the system determines that the capabilities of the guest device match the subscriber's device capabilities, then the VCA system will present itself to the guest as supporting only those capabilities. Thus, the system will continue using those capabilities and the guest will leave a message for the subscriber at the VCA system using the matching capabilities.

On the other hand, if the guest system cannot support the capabilities of the subscriber's device, the VCA system presents its preferred default capabilities to the guest at step 220. The system may maintain multiple sets of default capability information that can be selectively presented to the guest device when the capability information does not match. The system will select the appropriate capability set by a rule such as subscriber's class of service (COS) or the combination of the guest's capability and the subscriber's capability. Next, in step 240, the session initiation ends. At some point during the session, at step 260, the guest, after listening to the subscriber's/system's greeting, leaves a message for the subscriber and the VCA system stores the message in the agreed upon format. After the guest has finished leaving a message for the subscriber, the session ends at step 280.

At some point later in time, the subscriber can dial into the VCA system and retrieve any stored messages. If the guest and subscriber supported similar formats, then the message will not have to undergo any transcoding before being retrieved by the subscriber. Thus, because the VCA system according to the present invention is able to present the subscriber's capabilities to a guest, rather than only being able to present the VCA system capabilities, the amount of transcoding resources required when a subscriber retrieves messages will be substantially reduced as compared to conventional store and forward systems.

While the illustrative embodiments above have been described with reference to a voice and/or video answering system, the features of the present invention can be applied to any store and forward messaging system that negotiates capabilities before sending data.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. For example, some or all of the features of the different embodiments discussed above may be combined into a single embodiment. Conversely, some of the features of a single embodiment discussed above may be deleted from the embodiment. Therefore, the present invention is not intended to be limited to the embodiments described herein but is to be accorded the widest scope as defined by the limitations of the claims and equivalents.

What is claimed is:

1. A method for initiating a session in a store and forward messaging system, said method comprising:

receiving a session connection request from a guest of the store and forward messaging system;

determining capability information of a device used by the guest to connect to the store and forward messaging system;

determining a subscriber of the store and forward messaging system for whom the guest wishes to deposit a message;

retrieving capability information of a device used by the subscriber of the store and forward messaging system for whom the guest wishes to deposit a message; and comparing the capability information of the device used by the guest to the capability information of the device used by the subscriber, wherein the capability information of the device used by the guest is compared to the capability information of the device used by the subscriber prior to the guest transmitting the message to the store and forward messaging system.

2. A method for initiating a session according to claim 1, wherein, if at least a portion of the capability information of the device used by the guest matches a portion of the capability information of the device used by the subscriber, the portion of the capability information that matches is presented to the guest.

3. A method for initiating a session according to claim 2, wherein, if at least a portion of the capability information of the device used by the guest does not match at least a portion of the capability information of the device used by the subscriber, a default capability information is presented to the guest.

4. A method for initiating a session according to claim 2, wherein the guest transmits the message to the store and forward system using at least the portion of capability information that matches.

5. A method for initiating a session according to claim 3, wherein the capability information comprises at least one of the following: a video codec, a rate of video codec, an audio codec, a rate of audio codec, a screen size of the device used by the guest or subscriber, and colors supported by the device used by the guest or subscriber.

6. A method for initiating a session according to claim 1, wherein, if at least a portion of the capability information of the device used by the guest does not match at least a portion of the capability information of the device used by the subscriber, a default capability information is presented to the guest.

7. A method for initiating a session according to claim 1, wherein the capability information comprises at least one of the following: a video codec, a rate of video codec, an audio codec, a rate of audio codec, a screen size of the device used by the guest or subscriber, and colors supported by the device used by the guest or subscriber.

8. A store and forward messaging system comprising:
a receiving unit which receives a session connection request from a guest of the store and forward messaging system;
a server coupled to the receiving unit, wherein the server contains an application; and
a data storage unit coupled to the server, wherein the data storage unit stores capability information of a device used by a subscriber of the store and forward messaging system,
wherein the application determines the subscriber for whom the guest wishes to deposit a message and compares capability information of a device used by the guest to connect to the store and forward messaging system with the capability information stored in the data storage unit regarding the device of the subscriber for whom the guest wishes to deposit a message, and
wherein the application compares the capability information of the device used by the guest with the capability information stored in the data storage unit prior to the guest transmitting the message to the store and forward messaging system.

9. A store and forward messaging system according to claim 8,
wherein, if at least a portion of the capability information of the device used by the guest matches a portion of the capability information stored in the data storage unit regarding the device of the subscriber for whom the guest wishes to deposit a message, the portion of the capability information that matches is presented to the guest.

10. A store and forward messaging system according to claim 9,
wherein, if at least a portion of the capability information of the device used by the guest does not match at least a portion of the capability information stored in the data storage unit regarding the device of the subscriber for whom the guest wishes to deposit a message, a default capability information is presented to the guest.

11. A store and forward messaging system according to claim 9, wherein the guest transmits the message to the store and forward system using at least the portion of capability information that matches.

12. A store and forward messaging system according to claim 10, wherein the capability information comprises at least one of the following: a video codec, a rate of video codec, an audio codec, a rate of audio codec, a screen size of the device used by the guest or subscriber, and colors supported by the device used by the guest or subscriber.

13. A store and forward messaging system according to claim 8,
wherein, if at least a portion of the capability information of the device used by the guest does not match at least a portion of capability information stored in the data storage unit regarding the device of the subscriber for whom the guest wishes to deposit a message, a default capability information is presented to the guest.

14. A store and forward messaging system according to claim 8, wherein the capability information comprises at least one of the following: a video codec, a rate of video codec, an audio codec, a rate of audio codec, a screen size of the device used by the guest or subscriber, and colors supported by the device used by the guest or subscriber.

15. A store and forward messaging system according to claim 8, further comprising:
a transcoding unit that is able to convert a message deposited by the guest to a format supported by the device used by the subscriber if at least a portion of the capability information of the device used by the guest does not match at least a portion of the capability information stored in the data storage unit regarding the device of the subscriber for whom the guest wishes to deposit a message.

16. A store and forward messaging system according to claim 8, wherein the subscriber may maintain multiple accounts on the store and forward system, wherein each of the subscriber's accounts includes a different set of capability information.

* * * * *